Jan. 9, 1968  C. R. LOGSDON  3,362,406
HYPODERMIC INJECTION APPARATUS
Filed March 22, 1965  2 Sheets-Sheet 1
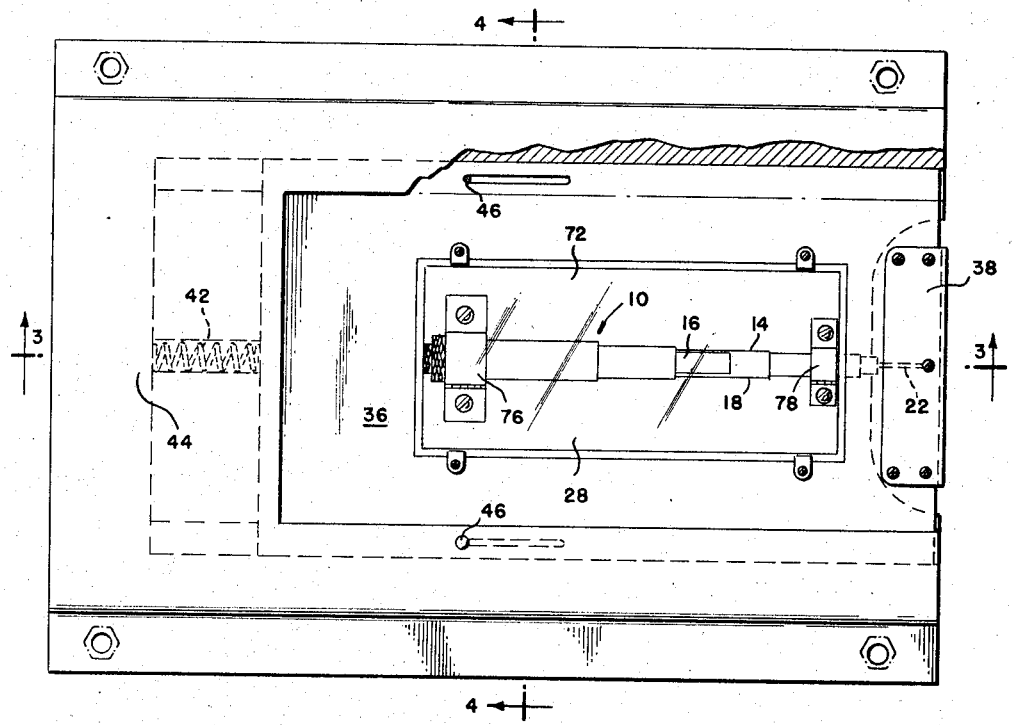
FIG__1
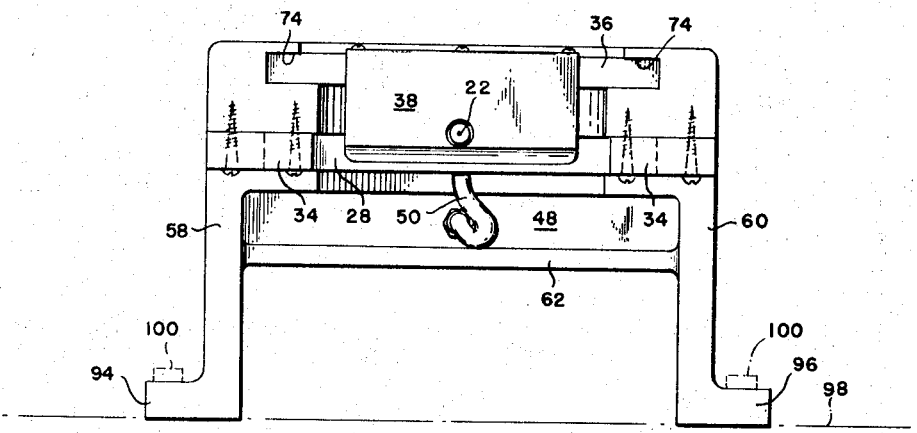
FIG__2
CECIL R. LOGSDON
INVENTOR.
BY Graybeal, Cole & Barnard
ATTORNEYS Jan. 9, 1968   C. R. LOGSDON   3,362,406
HYPODERMIC INJECTION APPARATUS
Filed March 22, 1965   2 Sheets-Sheet 2
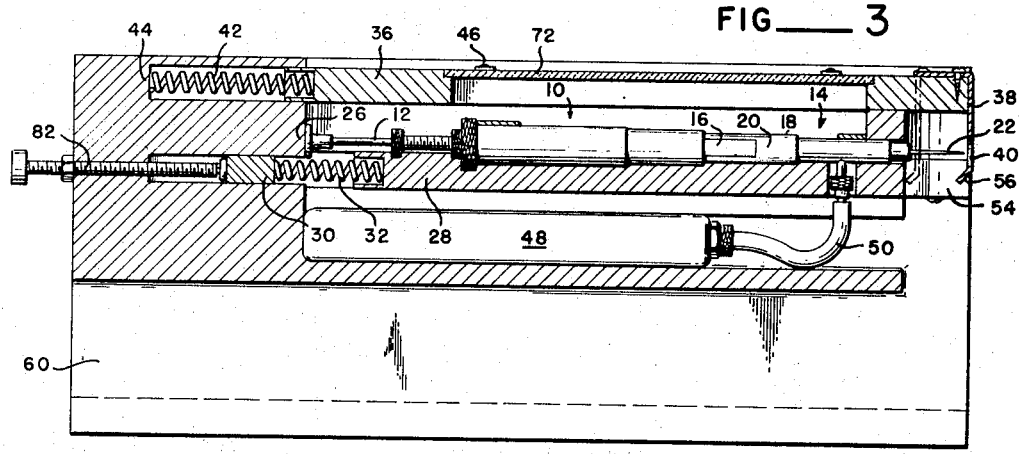
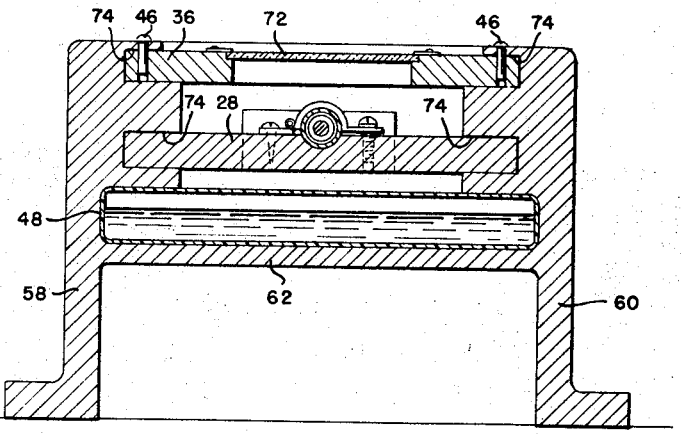
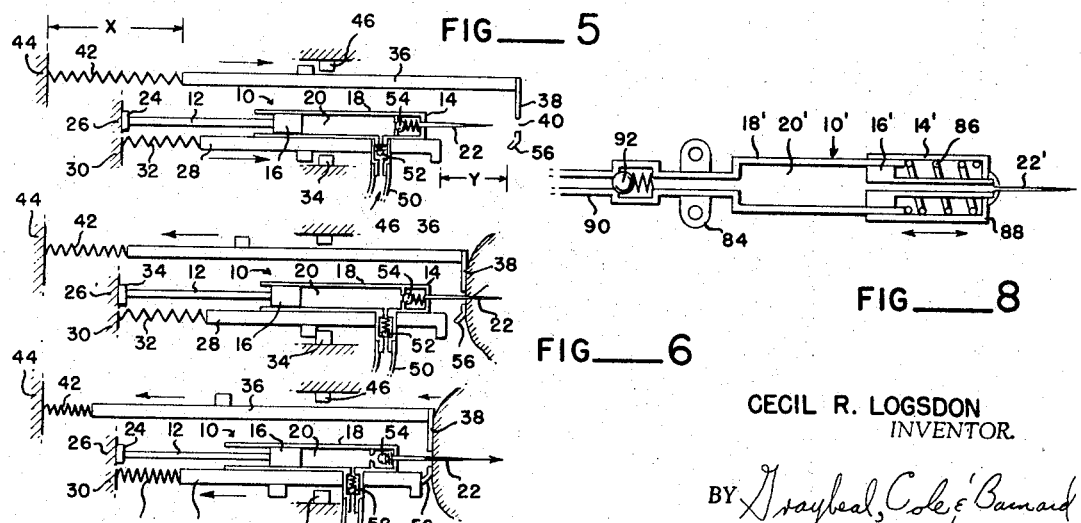
CECIL R. LOGSDON
INVENTOR.
BY Graybeal, Cole, & Barnard
ATTORNEYS

United States Patent Office 3,362,406
Patented Jan. 9, 1968

3,362,406
HYPODERMIC INJECTION APPARATUS
Cecil R. Logsdon, 19815 Bing Road,
Alderwood Manor, Wash. 98001
Filed Mar. 22, 1965, Ser. No. 441,934
15 Claims. (Cl. 128—218)

ABSTRACT OF THE DISCLOSURE

A mounted hypodermic apparatus having a movable shield or guard adapted to normally cover its needle. Injecting poison or some other fluid into a small animal by picking the animal up in the hands, then pressing his body against the guard to move it inwardly and bare the needle, and cause needle penetration into the animal, and then injecting the fluid into the animal. Injecting apparatus utilizing body pressure of the animal to force the fluid into the animal.

---

The present invention relates to apparatus for injecting fluids into small animals, and more particularly to a fixed position hypodermic syringe apparatus to which small animals are successively brought for an injection.

Hypodermic injection apparatuses according to the present invention are essentially characterized by a hypodermic syringe mounted on a small cart or table, for example. The syringe comprises a fixed inboard portion and an axially moveable outboard portion including an outwardly projecting hypodermic needle. The syringe is adapted to inject fluid through the needle in response to an inward movement of the said outboard portion, which is normally biased outwardly (e.g. by a compression spring). The point of the needle is normally shielded by or concealed behind a rigid shield member of substantial area. The shield member is normally biased outwardly (e.g. by another compression spring) into a position of rest outboardly of the needle. In operation, an animal is picked up by the operator and carried to the injection apparatus. Its body is then pressed against the shield. In response to this pressure the shield moves inwardly an amount sufficient to first expose the needle through an opening in the shield, and cause it to penetrate into the animal. Further pressure on the shield causes the outboard portion of the syringe to be displaced inwardly which in turn causes fluid to be injected through the needle into the animal.

By way of typical example, a hypodermic injection apparatus of this type is particularly useful as a device for killing mink and similar type small animals. Many devices have been developed for killing the mink by snapping their necks. Most mink ranchers, however, prefer to kill their animals by giving them an injection of a deadly poison, such as nicotine sulfate, for example. A small dose of such a poison under the skin, particularly in the chest cavity, will kill the animal in about three to twelve seconds. The conventional method for injecting the poison into the mink is a two-man operation. One man holds the animal while the other does the injection with a conventional handheld hypodermic syringe. This method presents problems because two experienced men are not always available at the time the mink pelts are ready for harvesting. Mink fur becomes most luxurious in a short span of days. If the mink are not killed and the pelts removed during this period, some quality may be lost, resulting in the farmer realizing a lower price for the pelts when they are eventually sold.

A principal object of the present invention is to provide a hypodermic injection apparatus that requires the services of but a single individual. Its use for injecting a poisonous fluid into mink makes the mink killing procedure a one-man operation.

A further object of the invention is to provide a semi-automatic apparatus for injecting fluids into small animals at a much faster rate than is possible with a conventional, handheld hypodermic syringe. Experience has shown that about two hundred forty-five mink can be killed in a forty-five minute period, by a single individual using a hypodermic injection apparatus constructed according to the present invention.

Yet another object of the present invention is to provide a hypodermic injection apparatus that is portable, light in weight, involves a minimum of parts and therefore may be easily and inexpensively manufactured, and is easy to operate.

Still another object of the present invention is to provide a hypodermic injection apparatus of the character described in which the needle is at all times shielded or covered, so that a poisonous fluid may be safely injected into small animals, without the worry of the operator or some other individual in the area making accidental contact with the needle. When the apparatus is not in use, the needle is shielded by the shield member that is normally biased into a position of rest outboardly of the needle. During use, the body of the animal being injected is between the needle and the operator and thus protects the operator from the needle.

These and other objects, features and advantages of the present invention will be apparent from the following description, appended claims, and annexed drawings.

Referring to the drawing wherein like reference characters designate like parts throughout the several views:

FIG. 1 is a top plan view of a preferred embodiment of the invention, showing the shield carriage being mounted above both the hypodermic syringe and the carriage for the outboard portion of said syringe, the shield being attached to the outboard end of the shield carriage, and further showing a typical arrangement of inner and outer stop means for the shield carriage, a compression spring for biasing the shield carriage forwardly, into a position of rest against its outer stop, and a glass or plastic window provided in the shield carriage, through which the operator can look to determine the presence and amount of fluid in the syringe;

FIG. 2 is a front elevational view of the apparatus shown by FIG. 1, such view showing a typical configuration of the shield, and the manner in which the opening in such shield is aligned with the hypodermic needle, and further showing a preferred relative positioning of the shield carriage, the carriage for the outboard portion of the hypodermic syringe, and the fluid reservoir, and a preferred manner of supporting such components;

FIG. 3 is a longitudinal sectional view taken substantially along line 3—3 of FIG. 1, with some parts being shown in elevation, such view showing a preferred manner of biasing the two carriages forwardly, involving the use of a compression spring between such carriage and a normally fixed stop element associated therewith, and also showing means for adjustably affixing the position of the stop member for the lower carriage, relative to the fixed inboard portion of the syringe;

FIG. 4 is a traverse sectional view taken substantially along line 4—4 of FIG. 1, and presenting a clear showing of the preferred manner of supporting the two carriages and the fluid reservoir;

FIG. 5 is a diagrammatic view, on a reduced scale, of fluid injection apparatus according to the present invention, showing the shield and the outboard portion of the fluid injection means being returned to their respective positions of rest by compression springs associated therewith, and further showing fluid being drawn from the fluid reservoir into the fluid chamber of the fluid injection means, as the volume of the fluid chamber is increased by outward movement of the outboard portion of the fluid injection means;

FIG. 6 is a view like FIG. 5, but showing the shield being moved inwardly by the body of an animal held in the hands of the operator, an amount sufficient to expose the needle and cause it to penetrate into the animal;

FIG. 7 is a view like FIGS. 5 and 6, but showing the shield being moved inwardly an additional amount, whereby it contacts and moves with it the lower carriage, and the outboard portion of the syringe attached thereto, causing fluid to be forced through the needle and into the animal;

FIG. 8 is a somewhat schematic, longitudinal sectional view of a modified form of hypodermic syringe, involving a fixed cylinder or barrel and a movable piston.

Referring more specifically to the several figures of the drawing, the preferred embodiment is shown to compise a hypodermic syringe 10 having a fixed inboard portion 12 and a movable outboard portion 14. FIGS. 5–7 diagrammatically show a syringe 10 of a type wherein the inboard portion 12 includes a piston 16, and the outboard portion 14 includes a cylindrical, preferably transparent, barrel 18. As will be evident, the piston 16 and the barrel 18 together form a variabe volume fluid chamber 20. The transparent barrel 18 may be provided with graduations along its length so that the dosage of fluid in the chamber 20 can be read directly by the operator. The outboard portion 12 includes a forwardly projecting tubular needle 22, the inboard end of which is in fluid-receiving communication with the chamber 20. In conventional manner, the outboard end of needle 22 is pointed.

As perhaps best illustrated by FIGS. 5–7, the inboard end 24 of the inboard portion 12 abuts and is held stationary against a fixed stop member 26. Stop member 26 is a part of a support structure which will hereinafter be described in detail.

The outboard portion 14 of the syringe 10 may be supported for movement on a lower carriage 28. A normally fixed stop member 30 is spaced inboardly of the inboard end of such carriage 28. A compression spring 32, interconnected between the lower carriage 28 and the stop member 30, serves to bias the carriage 28 outwardly, into a position of rest against an outer stop 34.

According to the present invention, a shield carriage 36 is offset above the lower carriage 28 and extends in juxtaposition with the syringe 10. A needle shield 38 is attached to the outboard end of carriage 36, and depends downwardly therefrom in the path of the needle 22. An opening 40 (FIG. 5) is coaxially aligned with the needle 22. A compression spring 42 interconnects between the carriage 36 and a fixed stop member 44 spaced inboardly of the inboard end of carriage 36. Spring 42 serves to bias the carriage 36 outwardly, into a position of rest against an outer stop member 46. In such position of rest the shield 38 is located outboardly of the pointed end of needle 22 and serves as a safety shield or guard therefor, functioning to prevent accidental contact with the needle point by the operator and all other persons in the area.

Preferably, a large capacity fluid reservoir 48 is provided, and the fluid chamber 28 is connected thereto by a conduit 50. A ball check valve 52 or the like may be provided in the conduit 50, and arranged to open when the pressure in conduit 50 is larger than the pressure in chamber 20, and to close when the pressure in chamber 20 exceeds the pressure in conduit 50. A second ball check valve 54 or the like may be provided between fluid chamber 20 and needle 22, and biased to close when the pressure in chamber 20 is less than ambient, and to open when such pressure in chamber 20 is greater than ambient.

In operation, when the above-described mechanism is at rest, the shield 38 is biased outwardly by the spring 42 acting on its carriage 36. Similarly, the lower carriage 28, and the outboard portion 14 of the syringe 10, carried thereby, are biased outwardly by spring 32. The shield 38 is disposed outboardly of the needle 22, and some of the fluid is in chamber 20. Let it be assumed that the fluid is a poison, such as nicotine sulfate, for example, and the fluid injection apparatus is to be used for killing mink or similar type animals. The operator reaches into the animal's cage and picks up an animal in his hands. He then presses the animal, preferably breast first, against the shield 38. Initially the shield 38 and its carrier 36 are depressed inwardly, and the spring 42 is compressed. The spring 32 holds the lower carriage 28 and the front portion 14 of the syringe 10 relatively stationary, and as the shield 38 is pushed past the tip of the needle 22, such needle 22 penetrates into the body of the animal as it is exposed through the opening 40. Eventually the lower lip portion 56 of the shield 38 contacts the outboard end of the lower carriage 28. Then, upon additional movement of the animal against the shield 38, the lower carriage 28, and the outboard portion 14 of the syringe 10 carried thereby, are moved inwardly by the shield 38. This causes the piston 16 to move relatively through the barrel 18 in a direction causing a decrease in the volume of chamber 20, and therefore causes some of the poisonous fluid to be forced out of the chamber 20 and through the needle 22 into the body of the animal. The animal is then pulled away from the shield 38 by the operator and set to one side, and the above-outlined procedure is repeated successively with other animals.

Referring now to FIG. 5, when the pressure is relieved from the shield 38, the springs 32, 42, immediately urge the upper carriages 28, 36, respectively, outwardly toward their positions of rest. As the forward portion of syringe 10 moves outwardly the piston 16 moves axially through barrel 18 in a direction causing an increase in the volume of chamber 20. A low pressure or suction is created in chamber 20 and its volume is increased, causing valve 52 to open, valve 54 to close, and another charge of fluid to flow from reservoir 48 through conduit 50 and into chamber 20. Preferably, reservoir 48 is adequately vented so that it is at atmospheric pressure, and the syringe 10 will act as a "lift" type of positive displacement pump.

Referring now to FIGS. 1–4, the upper and lower carriages 36, 28, respectively, are each shown to be in the form of rectangular block members having side edges in parallelism with each other, and with the needle. The support structure for such carriages may comprise a pair of generally upright side walls 58, 60, suitably interconnected by means including a shelf 62. Shield carriage 36 may be supported for endwise reciprocal movement by a pair of laterally spaced guide slots 64, 66 in which the edge portions of the carriage 36 are slidably received. Similarly, the lower carriage 28 may be supported for endwise reciprocal movement by a second set of guide slots 68, 70.

Preferably, the shield carriage 36 is provided with a window 72 of glass or transparent plastic through which the operator may look to determine the presence and quantity of fluid in the transparent barrel 18 of the syringe 10. Parallel longitudinal slots 74 may be formed in the edge portions of shield carriage 36 that are engaged by the guide slots 64, 66, to receive therein the lower portions of pins 46, constituting a preferred form of the outer stop member 46 diagrammatically illustrated in FIGS. 5–7.

As perhaps best shown by FIGS. 2 and 3, the outer stop means 34 for the lower carriage 28 may take the form of a pair of blocks 34 secured to the mounting structure laterally outboardly of the shield 38 (FIG. 2). Such members 34 are positioned to abut against the respective outboard corner portions of carriage 28, and in that way limit the outward movement of such carriage 28.

Referring again to FIGS. 1 and 3, the outboard portion 14 of the syringe 10 may be firmly secured to the upper surface of the carriage 28 by means of a pair of clamps 76, 78. The inboard end 24 of the inboard portion 12 of syringe 10 may be urged in a fixed position against the stop 26 by means of a spring (not shown) located inside of syringe 10, or it may be clamped or otherwise securely connected to the stop 26.

In FIG. 3, the stop 26 is shown to be a part of the mounting structure. The stop 30 is shown to consist of a block mounted to move in-and-out relative to member 24. A set screw 82 or the like is provided for adjustably affixing the position of stop member 30 relative to the fixed portion 12 of syringe 10. Movement of stop member 30 relative to piston 16 also changes the position of the outboard end of carriage 28 relative to the lower lip 56 on shield 38. The shield carriage 36 may be moved inwardly only a predetermined distance, i.e. until it contacts stop 44. The difference between the total inward displacement (designated $x$ in FIG. 5) of shield carriage 36 and the amount of displacement (designated $y$ in FIG. 5) that must occur before lip 56 contacts the outboard end of carriage 28 equals the distance that piston 16 will travel relatively through cylinder 18 during the remaining travel of carriage 36.

If set screw 82 is manipulated so as to increase the at rest spacing $y$, the amount of relative travel of piston 16 through barrel 18 will be decreased, and in turn the amount of fluid that will be injected through needle 22 upon inward movement of portion 14 will also be decreased. Conversely, if set screw 82 is rotated in the opposite direction, so as to decrease the at rest spacing $y$, the amount of relative travel of piston 16 through barrel 18 will be increased, as will the amount of fluid that is forced through needle 22. Thus, set screw 82 serves as a means for adjusting the dosage of the fluid injected through needle 22.

Of course, it is to be realized that the set screw 82 is merely a typical and therefore nonlimitative example of a means for adjustably affixing the position of stop 30, and that various other arrangements would serve this purpose just as well.

The fluid reservoir 48 may take the form of a flat, generally rectangular vessel or container, adapted to slidably fit into the support structure between the side walls 58, 60, and on the shelf 62. Conduit 50 is made from surgical rubber or a similar pliable substance so that it will give as necessary during movement of the lower carriage 28.

Referring now to FIG. 2, the shield 38 is shown to be in the form of a relatively rigid plate of substantial area. The stops 34 for the lower carriage 28 are spaced laterally outboardly of shield 38 so as to not interfere with its inward movement.

FIG. 8 shows a modified form of the fluid injection means, such form being identified by the reference character 10'. In this form, the inboard portion 12' includes the cylinder or barrel 18', and the outboard portion 14' includes the piston 16'. As before, the needle 22' is mounted on the outboard portion 14'. The inboard portion 12' is shown secured to the support structure by a fastener 84. A spring 86, equivalent in function to spring 32, is shown interposed between the outboard end of cylinder 18 and the inwardly directed surface of a wall 88 at the outboard end of member 14'. The fluid may be supplied to the fluid chamber 20' by way of a conduit 90 containing a normally closed check valve 92.

In this form of fluid injection means the outboard portion 14' may constitute its own carriage. Thus, in operation the shield 38 will push directly against the outboard end of portion 14', rather than against a separate carriage element.

Preferably, the support structure is provided with base flanges 94, 96 or the like by which it may be secured to the top 98 of a mobile unit, such as by bolts 100. The mobile unit may take the form of a wheeled cart that includes means for securing it against movement during use,, e.g. means for locking the wheels or for frictionally gripping the floor. This is so the cart and the mounting structure will remain relatively stationary when the shield 38 is pushed against during operation of the apparatus. Alternatively, the hypodermic injection apparatus may be counted on top of or built into a stationary stand or table.

These and other variations, adaptations, and features characteristic of hypodermic injection apparatus according to the present invention will be apparent to those skilled in the art to which the present invention is addressed, within the scope of the following claims.

What is claimed is:

1. In combination: a support; fluid injection means mounted on said support and having a inboard portion, that is fixed relative to said support, and outboard portion forming a fluid chamber with said inboard portion, and including an outwardly projecting needle communicating at its inner end with fluid in said chamber, said support including, means supporting said outboard portion for movement relative to said inboard portion and said support, back-and-forth along a path in which the needle moves substantially axially, and means normally biasing said outboard portion outwardly; a movable shield for said needle, including an opening sized to accommodate said needle; means supporting said shield on said supports independently of said fluid injection means, for movement back-and-forth relative to said fluid injection means, along a path in which said opening is aligned with said needle, and means normally biasing said shield into a position wherein it is situated outboardly of the needle, but permitting said shield to be moved inwardly an amount sufficient to first expose the needle through said opening in said shield, and to then contact and move the outboard portion of the fluid injection means inwardly, with said fluid injection means forcing some of the fluid through the needle in response to such inward movement of its outboard portion.

2. The combination of claim 1, wherein said shield comprises a relatively rigid plate of substantial area.

3. The combination of claim 1, wherein the means suporting said shield for movement back-and-forth relative to the fluid injection means comprises a carriage in juxtaposition with said fluid injection means, and having an outboard portion on which the shield is mounted, and a pair of generally straight side edges, in parallelism with each other and with said needle; and guide means on said support for side edge portions of said carriage, supporting said carriage for back and forth movement.

4. The combination of claim 3, wherein the means normally biasing the shield into a position forwardly of the needle comprises a fixed stop member on said support spaced inboardly of said carriage, and at least one compression spring interconnecting between said stop member and said carriage.

5. In combination: a support; fluid injection means mounted on said support and having a rear portion, that is fixed relative to said support, a front portion forming a fluid chamber with said rear portion, and including a forwardly projecting hypodermic needle communicating at its rear with the fluid in said chamber, said support including means supporting said front portion for movement relative to said inboard portion and said support, back-and-forth along a path in which the needle moves substantially axially, and between front and rear limits which are fixed relative to each other, and to said fixed rear portion, and means normally biasing said front portion forwardly; a movable shield for said needle comprising a relatively rigid plate of substantial area, having an opening therein sized to accommodate said needle; means supporting said shield for movement back-and-forth relative to said fluid injection means, along a path in which said opening is aligned with said needle, said means comprising a generally quadrangular carriage offset vertically above said fluid injection means and having generally parallel side edge portions, guide slot means on the support engaging the side edge portions of said carriage, and supporting the carriage for back-and-forth movement, and means mounting said shield onto the said carriage so that it depends downwardly therefrom into a position in front of the carriage, wherein the opening therein is aligned with said needle; and means normally biasing said shield into a position forwardly of the needle, but permitting it to be moved rearwardly, when pressed against by the body of an animal to be injected, an amount sufficient to first expose the needle through the opening in said shield, and cause it to penetrate into said animal, and to then contact and move the front portion of the fluid injection means rearwardly, with said fluid injection means forcing some of the fluid through the needle and into the animal, in response to such rearward movement of its front portion.

6. The combination of claim 5, wherein the means supporting the front portion of the fluid injection means comprises a generally quadrangular lower carriage offset below said shield carriage and having generally parallel side edge portions, and guide slot means on the support engaging the side edge portions of the lower carriage, for mounting said carriage, and the front portion of the fluid injection means carried thereby, for back-and-forth movement.

7. The combination of claim 6, wherein the front limit of travel for the front portion of the fluid injection means is established by at least one fixed stop member connected with the guide means for the lower carriage, and positioned to be contacted by a portion of the forward end of such lower carriage.

8. The combination of claim 6, wherein the rear limit of travel of the front portion of the fluid injection means is established by a normally fixed stop member situated rearwardly of the lower carriage, and the means normally biasing said front portion forwardly comprises at least one compression spring interconnecting between said stop member and the lower carriage.

9. Apparatus for injecting a fluid into animals, including: a support; a hypodermic syringe mounted on said support and comprising an inboard portion that is fixed relative to said support and an outboard portion forming a variable volume fluid chamber with said inboard portion, and including an outwardly projecting tubular needle, having an inboard end in fluid receiving communication with said fluid chamber and a pointed outboard end, with inward movement of said movable portion decreasing the volume of said chamber, and causing fluid therein to be forced from said chamber through said needle; means supporting said outboard portion for movement relative to said inboard portion and said support, in-and-out along a path in which the needle moves substantially axially; a normally fixed stop member situated inwardly of said carriage means; means normally biasing said outboard portion outwardly, said means comprising at least one compression spring interconnected between said stop member and the carriage for said outboard portion; a movable needle shield having an opening therein sized to accommodate said needle; means mounting said shield for in-and-out movement relative to said syringe, along a path wherein the opening in the shield is aligned with said needle; and means normally biasing said shield into a position of rest outwardly of the needle, but permitting said shield to be moved inwardly when pressed against by the body of an animal that is to receive an injection, an amount sufficient to first expose the needle through the opening in said shield, and allow it to penetrate into the animal, and to then displace the outboard portion of the fluid injection means inwardly, thereby causing some of the fluid in said variable volume fluid chamber to be forced through said needle and into the animal.

10. The combination of claim 9, further including means for adjustably affixing the in and out position of said stop member relative to the at rest position of the shield.

11. Apparatus for injecting a fluid into animals, including: a stationary support; a hypodermic syringe mounted on said support and comprising an inboard portion and an outboard portion, one of which includes a transparent, cylindrical fluid forming chamber barrel, and the other includes a piston movable axially in said barrel, said outboard portion including an outwardly projecting tubular needle having an inboard end in fluid-receiving communication with said fluid chamber and a pointed outboard end, with inward movement of said outboard portion causing the piston to move relatively through said barrel in a direction causing a decrease in the volume of said chamber, and outward movement of said outboard portion causing movement of said piston relatively through the barrel in the opposite direction, and causing an increase in the volume of said chamber; means mounting the inboard portion of said hypodermic syringe in a fixed position on said support; means mounting the outboard portion of said syringe on said support for in-and-out axial movement of the same, including the needle, said means including means normally biasing said outboard portion forwardly; a movable shield for said needle comprising a relatively rigid plate of substantial area, and having an opening therein sized to accommodate said needle; shield carriage means supporting said shield for movement in-and-out relative to said fluid injection means, along a path in which said opening is aligned with said needle, said shield carriage means mounted on said support so as to be disposed above said syringe and having side edges which are generally parallel to each other and to the needle of the syringe, with the shield depending downwardly from the outboard end of said carriage, into the path of the needle; and means normally biasing said shield into a position of rest forwardly of the needle, but permitting said shield to be moved rearwardly, when pressed upon by the body of an animal which is to receive an injection, an amount sufficient to first expose the needle through the opening in said shield and cause it to penetrate into the animal, and to then move the outboard portion of the syringe inwardly, so that some of the fluid in the fluid chamber is forced into the animal.

12. The combination of claim 11, wherein the shield carriage includes a window of a transparent material through which the operator may look while injecting fluid into the animal, so that he can watch the piston move relatively through the transparent barrel and see whether or not a sufficient amount of fluid is in the fluid chamber.

13. The combination of claim 11, further including a source of the fluid to be injected, and conduit means interconnected between said source and the variable volume chamber in said syringe, and allowing fluid to flow into said chamber upon forward movement of the forward portion of said syringe.

14. Apparatus for injecting a fluid into animals, comprising: a support; fluid injection means mounted on said support and including a chamber of said fluid, an outwardly projecting needle communicating at its inner end with said chamber, and piston means for moving fluid from said chamber to and through said needle; a movable pressure plate including an opening sized to accommodate said needle; means supporting said plate on said support independently of said fluid injection means for back-and-forth movement relative to said fluid injection means along a path in which said opening is aligned with said needle; and means on the support normally biasing said pressure plate into a position outwardly of the needle, whereat it functions as a shield for the needle, but permitting said plate to be moved inwardly by the pressure of the body of an animal that is to receive an injection, an amount sufficient to expose the needle through said opening and allow it to penetrate into the animal; and means for actuating said piston means to move fluid from said chamber, through the needle, and into the animal, following needle penetration into the animal.

15. Apparatus for rapidly killing small fur bearing animals and the like, comprising: a support; stationarily mounted on a fixed base; a hypodermic syringe mounted on said support and comprising an inboard portion and an outboard portion, one of which includes a tubular barrel, and the other includes a piston movable axially in said barrel and forming a poisonous fluid chamber therewith, said outboard portion including an outwardly projecting tubular needle having an inboard end in poisonous fluid-receiving communication with said fluid chamber and a pointed outboard end, with movement of said piston in one direction relatively through said barrel causing a decrease in the volume of said chamber and injection through said needle of any poisonous fluid in said chamber, and with movement of said piston in the opposite direction relatively through said barrel causing an increase in the volume of said chamber and creating a sub-atmospheric pressure in said chamber; a reservoir of said poisonous fluid spaced from said syringe; conduit means interconnected between said reservoir and said poisonous fluid chamber in said syringe, and allowing fluid to flow from said reservoir into said chamber upon chamber volume enlarging movement of said piston; means for injecting poisonous fluid from said fluid chamber through said needle and into an animal to be killed, by moving the piston relatively through said barrel in the chamber volume reducing direction, following operator movement of said animal against said needle to cause penetration of the needle into the animal; and means for moving the piston relatively through the barrel in the chamber volume enlarging direction following injection of the poisonous fluid into the animal.

References Cited

UNITED STATES PATENTS

| | | | |
|---|---|---|---|
| 1,367,008 | 1/1921 | Bessesen | 128—220 |
| 2,656,785 | 9/1953 | Gannon | 99—257 |
| 2,825,334 | 3/1958 | Kas | 128—218 |
| 2,845,066 | 7/1958 | Hoppe | 128—218 |
| 2,876,770 | 3/1959 | White | 128—215 |

RICHARD A. GAUDET, *Primary Examiner.*

D. L. BAKER, *Assistant Examiner.*